(12) United States Patent
Hirt

(10) Patent No.: US 8,975,856 B2  
(45) Date of Patent: Mar. 10, 2015

(54) METHOD OF IMPROVING EFFICIENCY IN A MULTIPHASE MOTOR, AND MOTOR FOR IMPLEMENTING SUCH A METHOD

(75) Inventor: Markus Hirt, Villingen-Schwenningen (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 118 days.

(21) Appl. No.: 13/576,114

(22) PCT Filed: Jan. 27, 2011

(86) PCT No.: PCT/EP2011/000354  
§ 371 (c)(1),  
(2), (4) Date: Jul. 30, 2012

(87) PCT Pub. No.: WO2011/092011  
PCT Pub. Date: Aug. 4, 2011

(65) Prior Publication Data  
US 2012/0293106 A1 Nov. 22, 2012

(30) Foreign Application Priority Data  
Jan. 30, 2010 (DE) .......................... 10 2010 006 337

(51) Int. Cl.  
*H02P 6/00* (2006.01)  
*H02P 6/08* (2006.01)

(52) U.S. Cl.  
USPC .. 318/721; 318/722; 318/400.13; 318/400.34

(58) Field of Classification Search  
USPC .......... 318/721, 722, 400.01, 400.13, 400.14, 318/400.34  
See application file for complete search history.

(56) References Cited

U.S. PATENT DOCUMENTS 4,477,761 A * 10/1984 Wolf .............................. 318/800  
5,608,300 A * 3/1997 Kawabata et al. ............ 318/721  
(Continued)

FOREIGN PATENT DOCUMENTS

DE 100 09 861 A 9/2001  
DE 100 20 946 A 11/2001  
(Continued)

OTHER PUBLICATIONS

Patent Abstracts of Japan, English abs. of Ninomiya+/Matsushita JP 2006-158141—2006.  
(Continued)

*Primary Examiner* — Paul Ip  
(74) *Attorney, Agent, or Firm* — Milton Oliver, Esq.; Oliver Intellectual Property LLC

(57) ABSTRACT

An electric motor (40) has a permanent-magnet rotor (46) and an apparatus for generating a three-phase sinusoidal current (i202, i204, i206) for supplying current to said motor (40), also a microprocessor (95) for executing the following steps: while the motor (40) is running at a substantially constant load, the motor is operated firstly at a predetermined operating voltage (U), and an amplitude of a current flowing to the motor is iteratively sampled, stored, and compared as applied voltage is decreased. If it is found, in this context, that the current flowing to the motor has not decreased as a result of reduction in the voltage amplitude, the motor (40) is operated at that current. If, however, it is found that the current flowing to the motor has decreased as a result of the reduction in the voltage delivered to the motor (40), the measurements and the comparison are repeated, optionally multiple times, in order to identify values for optimized efficiency.

13 Claims, 8 Drawing Sheets

(56) References Cited

U.S. PATENT DOCUMENTS

| | | | |
|---|---|---|---|
| 6,388,416 B1* | 5/2002 | Nakatani et al. | 318/700 |
| 7,026,782 B2* | 4/2006 | Aoki et al. | 318/721 |
| 7,088,082 B2* | 8/2006 | Jung | 323/275 |
| 7,102,306 B2* | 9/2006 | Hamaoka et al. | 318/400.01 |
| 7,148,636 B2* | 12/2006 | Ueda et al. | 318/114 |
| 7,412,339 B2* | 8/2008 | Ramu et al. | 702/65 |
| 7,484,258 B2* | 2/2009 | Kim et al. | 8/158 |
| 7,834,574 B2* | 11/2010 | West et al. | 318/496 |
| 7,839,114 B2* | 11/2010 | Ichiki et al. | 318/727 |
| 7,880,425 B2* | 2/2011 | Welchko et al. | 318/722 |
| 8,427,089 B2* | 4/2013 | Suzuki | 318/400.14 |
| 2005/0116583 A1* | 6/2005 | Nishio et al. | 310/317 |
| 2005/0154545 A1* | 7/2005 | Ramu et al. | 702/65 |
| 2006/0012329 A1* | 1/2006 | Aoki et al. | 318/721 |
| 2006/0082339 A1* | 4/2006 | Hamaoka et al. | 318/439 |
| 2006/0091843 A1* | 5/2006 | Kuwano et al. | 318/685 |
| 2008/0258672 A1 | 10/2008 | Osman et al. | 318/705 |
| 2008/0265829 A1* | 10/2008 | Hayashi et al. | 318/781 |
| 2008/0292291 A1* | 11/2008 | Tang et al. | 388/811 |
| 2009/0134833 A1* | 5/2009 | West et al. | 318/496 |
| 2009/0134835 A1* | 5/2009 | Welchko et al. | 318/801 |
| 2010/0253260 A1* | 10/2010 | Doyama et al. | 318/400.14 |
| 2011/0050139 A1* | 3/2011 | Ichiki et al. | 318/400.34 |
| 2012/0068643 A1* | 3/2012 | Suzuki | 318/400.13 |
| 2013/0069572 A1* | 3/2013 | Maekawa | 318/400.14 |

FOREIGN PATENT DOCUMENTS

| | | |
|---|---|---|
| DE | 102006026560 A | 12/2007 |
| JP | 2006/158141 A | 6/2006 |
| WO | 2007-141084 A | 12/2007 |

OTHER PUBLICATIONS

Wikipedia, "PIC16F1938/9 Datasheet 41574B" retrieved Jul. 30, 2012 from Microchip Technology Inc.

* cited by examiner

METHOD OF IMPROVING EFFICIENCY IN A MULTIPHASE MOTOR, AND MOTOR FOR IMPLEMENTING SUCH A METHOD

CROSS-REFERENCES

This application is a section 371 of PCT/EP11/00354, filed Jan. 27, 2011 published Aug. 4, 2011 as WO 2011-092011-A, and further claims priority from German application DE 10 2010 006 337.1, the entire content of which is hereby incorporated by reference.

FIELD OF THE INVENTION

The invention relates to a method for improving efficiency in a multiphase motor, and it relates to a motor for carrying out such a method. The motor is preferably a three-phase permanent magnet synchronous motor (PMSM).

BACKGROUND

Good efficiency with little hardware complexity is desirable for the operation of an electronically commutated motor.

The efficiency of a motor is defined by $$\text{Efficiency} = P_{out}/P_{in} \quad (1)$$

When the efficiency is at its maximum, the quotient $P_{out}/P_{in}$ must therefore also be at its maximum.

In the above equation, $$P_{in} = U*I = \text{electrical power absorbed by the motor} \quad (2)$$

$$P_{out} = T*n = \text{mechanical shaft power output} \quad (3),$$

where
U=voltage
I=current
T=torque
n=rotation speed.

At a constant load torque T=constant and constant rotation speed n=constant, i.e. in a state of constant load that exists, for example, in the case of a fan in continuous operation, the variable component in equation (1) is the absorbed power level $P_{in}=U*I$.

The voltage Û is normally constant, and the current I is thus the variable to be controlled.

The definition of the so-called air-gap torque is $$T_{Mi}(t) = C_M * \Psi(t) * I(t) \quad (4)$$

where
$T_{Mi}$=internal torque or air-gap torque of the motor
$C_M$=machine constant
ψ=concatenated flux
I=current to the stator, e.g. current in one phase, or total current to the stator, as explained below.

The requirement that the curve for $T_{Mi}$ be uniform, or "smooth," yields the requirement that both the concatenated flux ψ and the current I should be sinusoidal. This results in the requirement that the phase relationship between current I and flux ψ be determined so that a maximum torque $T_{Mi}$ is obtained.

If the stator flux ψ and stator current I in a three-phase synchronous motor are parallel vectors, the torque T generated by the motor is then equal to zero. If, on the other hand, the space vector is at right angles to the stator current, a maximum torque is then produced. This is similar to the situation with a direct-current motor.

Generating this right angle by a control procedure requires a control loop with feedback to the machine, indicating the position of the rotor. This feedback has often been implemented in synchronous machines using three Hall sensors. Today, in most cases, encoders (resolvers), optical incremental and absolute value sensors, or inductive sensors are used. Sensorless control systems can be carried out, in a context of block commutation, by measuring the back-EMF induced in the motor.

It is known, from the prior art, to operate a three-phase synchronous motor with good efficiency using field-oriented control (FOC). As depicted in FIG. 8, in this case the rotor position, and thus the phase relationship of the flux, is ascertained either via a rotor position sensor or using sensorless methods, e.g. a so-called "observer" design.

In field-oriented control (FOC), the measured phase currents are broken down by matrix operations (Park-Clarke transformation or inverse Park-Clarke transformation) into two components: a field-forming part id and a torque-forming part iq. This type of subdivision into components makes it possible in FOC to modify or control the field-forming variable id independently of the torque-forming variable iq. The field-forming variable is equal to zero at the point of maximum efficiency. This results in a special case that can easily be implemented with no need to carry out complex matrix operations, i.e. FOC can be dispensed with, in this special case.

Because matrix operations are not necessary, a simple microprocessor can be used, whereas expensive microprocessors having a digital signal processor (DSP) would otherwise be required for FOC.

In this case, a brief measurement operation can be used to determine the phase relationship between flux ψ and motor current I which results in the maximum torque T. The equation is:

$$F(x) = \int_0^\pi \sin(x) * \sin(x+\alpha) = \frac{\cos(\alpha)*\pi}{2} = \max.$$

where:
x=rotation angle of rotor, usually measured in radians
α=phase difference between current I and flux ψ (see FIG. 1)

1. Necessary:

$$f'(\alpha) = \frac{d}{d(\alpha)} \frac{\cos(\alpha)*\pi}{2} = 0 \Rightarrow \frac{-\sin(\alpha)*\pi}{2} = 0 \Rightarrow \alpha = 0$$

2. Sufficient:

$$f''(\alpha) = \frac{d}{d(\alpha)} \frac{-\sin(\alpha)*\pi}{2} > 0$$

for $$\alpha = 0 \Rightarrow f''(0) = \frac{\cos(0)*\pi}{2} = \frac{\pi}{2}$$

This calculation yields the requirement for a sinusoidal current, which must be in-phase with the concatenated flux ψ, in order for efficiency to become optimal.

This is illustrated in FIGS. 1 and 2. The number 20 illustrates the overlap between a phase current, e.g. i_U, and the variable ψ. It is evident that the area 20 reaches its maximum when ψ and i_U are in-phase.

If the flux ψ and current I deviate from the sinusoidal shape, FIG. 1 likewise indicates the need for the in-phase condition, in order to obtain improved efficiency.

SUMMARY OF THE INVENTION

It is therefore an object of the invention to make available a novel method of operating a PMSM (Permanent Magnet Synchronous Motor), and a novel PMSM which operates according to the method.

According to the invention, this object is achieved by a method wherein a control circuit applies three phases of sinusoidal current to the motor windings, and the motor is operated at constant load, while a microprocessor reduces the applied motor voltage until motor current sampling reveals that an optimal efficiency level has been achieved, the optimizing steps being repeated if a change in motor load is detected.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 3:
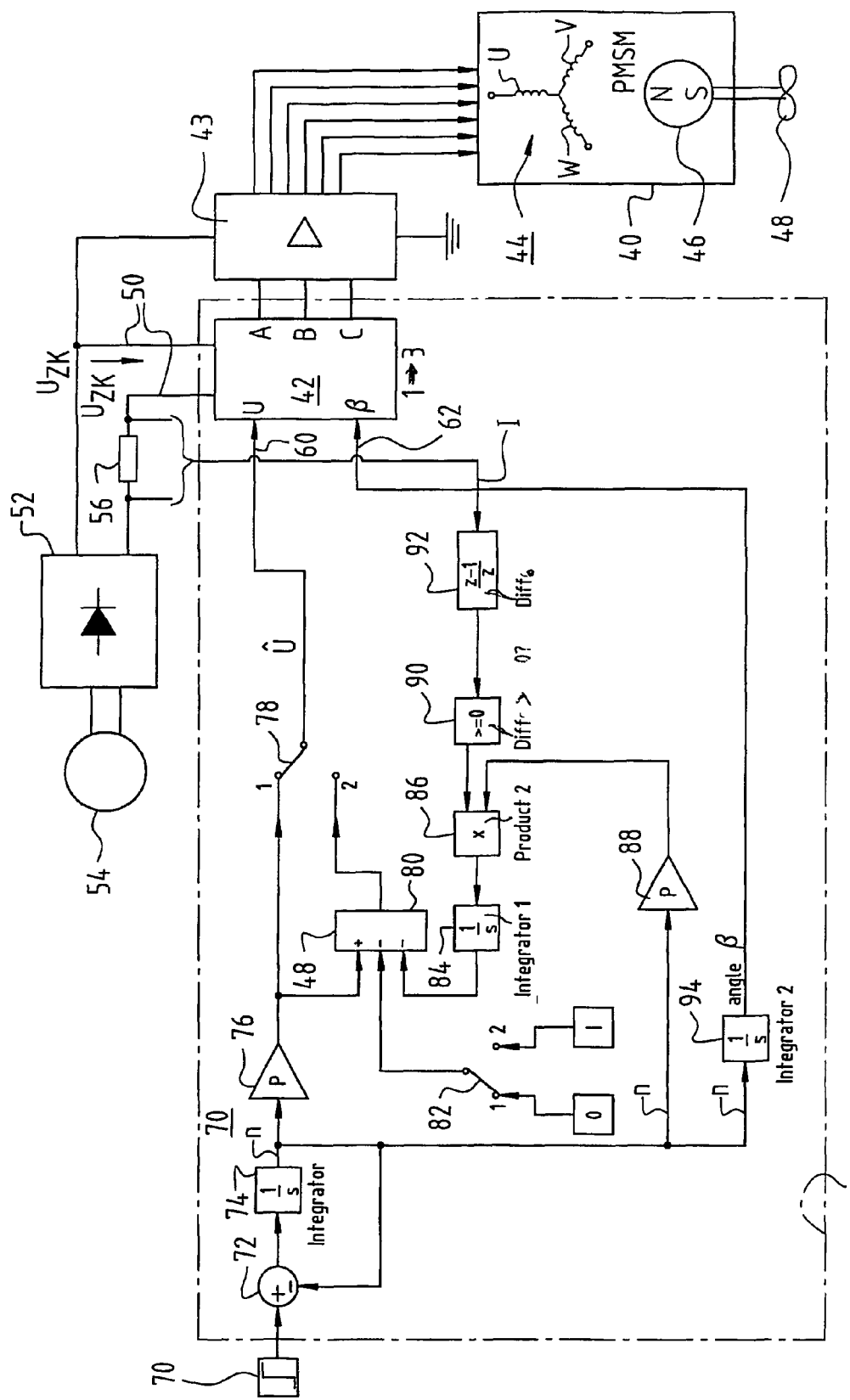
FIG. 3 shows the construction of a circuit for automatically optimizing the efficiency of a PMSM.

FIG. 3 shows an exemplifying embodiment of a multiphase permanent-magnet synchronous motor 40 that, during operation, is supplied with a multiphase alternating voltage via an inverter 42. A three-phase motor 40 having a star-configured stator winding 44 is depicted. A delta configuration is alternatively possible (see FIG. 4). Other numbers of phases are likewise possible. Motor 40 has a symbolically depicted permanent-magnet rotor 46 that is depicted as having two poles but can of course have four, six, eight, ten, etc. poles. This rotor 46 preferably has a sinusoidal magnetization, since motor 40 then produces a largely constant torque when sinusoidal stator currents are used.

Figure 1:
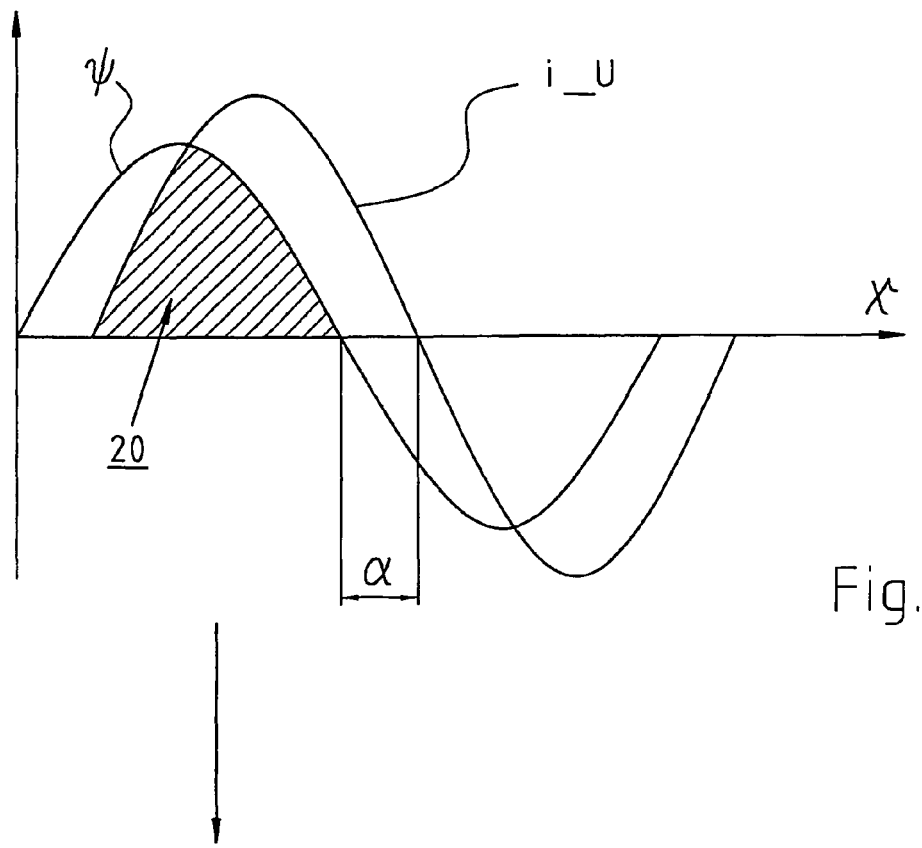
FIG. 1 shows the phase relationships between the concatenated flux ψ (corresponding approximately to motor voltage U) and the current i_U in the stator phase U of a PMSM, a phase shift α being present which impedes optimum efficiency.
Figure 2:
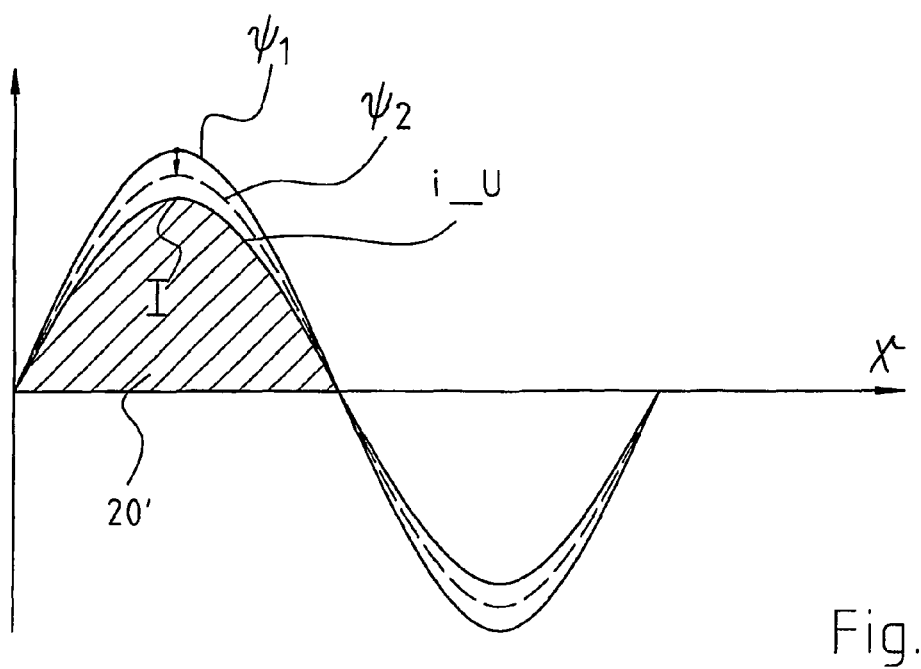
FIG. 2 shows a phase relationship with optimized efficiency; the flux ψ and phase current i_U are in this case in phase, and the efficiency is in the vicinity of its optimum.

FIG. 1 and FIG. 2 each depict the strand current i_U, and the latter is therefore also shown in FIG. 3. Motor 40 can have any configuration, e.g. internal-rotor motor, external-rotor motor, motor with planar air gap, etc.

Motor 40 serves, for example, to drive a fan 48, which represents a largely constant load during operation and serves, for example, to cool an electronic device, e.g. a computer. Another application is, for example, driving a pump for liquid cooling of a processor, in which case the load is likewise largely constant.

In the exemplifying embodiment, a DC link circuit 50 is used. This can be connected, for example, to the exchange battery of a telephone exchange. As depicted, link circuit 50 is powered, via a rectifier 52, from an alternating-current grid 54.

The current I in link circuit 50 is measured or sampled at a measurement element 56, e.g. a measuring resistor or a current transformer (see FIG. 3).

An FOC (Field Oriented Control) component 42 receives, at its input 60, a (variable) voltage U. The amplitude $\hat{U}$ of this voltage is modified, in steps, during efficiency optimization. Component 42 furthermore receives, at its input 62, an angle β that defines the speed of the rotating field generated in motor 40. Because motor 40 is synchronous, it does not inherently require a rotor position sensor, but such a sensor may be necessary, in order to allow continuous monitoring as to whether rotor 46 is rotating during operation, or whether it has come to a stop because its pull-out torque has been exceeded. The FOC component 42 controls a three-phase inverter 43, to which winding 44 of motor 40 is connected.

Motor 40 has a rotation speed controller 70 for specifying the frequency of the rotating field to be generated by components 42, 43. The output signal of controller 70 is applied to a summing unit 72 that produces a rotation speed ramp from zero speed to a speed n, i.e. a slow rise in rotation speed. The output signal of summing unit 72 is applied to an integrator 74, which generates the ramp function and whose output signal is applied to a negative input of summing unit 72.

The motor has a switch 78 having two switch positions: "1" and "2".

The switch position "1" is used
a) when the motor is starting up, i.e. upon acceleration, and
b) when changes in rotation speed occur.

This switch position "1" is also referred to as "adjusted" operation, since the motor is adjusted to specific operating data.

The switch position "2" signifies a seeking function, and is set when efficiency needs to be optimized by a seeking function (see FIGS. 1 and 2).

A signal for the rotation speed n is obtained at the output of integrator 74, and is applied to an element 76 that generates a rotation speed-dependent factor P. This determines the voltage amplitude according to the formula $$\hat{U} = n*P \qquad (5),$$

i.e. the voltage amplitude $\hat{U}$ increases as the rotation speed rises. In "adjusted" mode, this amplitude is applied via switch 78 (switch position 1) to input 60 of inverter 42, with the result that the latter operates at an optimum working point.

Position "2" of switch 78 is set when the efficiency is to be optimized by a seeking function. In this position, terminal 60 is connected to a summing element 80 which serves to calculate the amplitude $\hat{U}$ when the seeking method for the optimum efficiency is activated.

The signal n*P (equation 5) is applied to a positive input of summing element 80. A "zero" signal is applied to a negative input via a switch 82 when switch 78 is in position "1". In position "2" (seek mode), a "1" signal is applied to this input. The output signal of an integrator 84 is applied to another negative input of summing element 80. This causes a reduction in amplitude in continuous operation.

The output signal of a multiplier 86 is applied to the input of integrator 84. This signal serves to generate an amplitude reduction ramp, which generates a value of 0*rotation speed-dependent reduction, or
1*rotation speed-dependent reduction.

A rotation speed-dependent factor P for the reduction of the amplitude $\hat{U}$ is applied to the one input of multiplier 86, from a transducer 88, to whose input the rotation speed n is applied.

The output signal of a decision element 90 is applied to the other input of multiplier 86, said element deciding between the criterion "greater than" (>) and
the criterion "less than or equal to" (≤).

The output signal of a difference element 92 is applied to the input of decision element 90, said element 92 serving to establish the difference between two successive measurements of current I. In other words, in the course of the seeking function, the amplitude of current I changes, until it has reached a minimum, and the current I rises again, once that minimum is reached.

An integrator 94 integrates the rotation speed value n and generates, at its output, the angle value β that is applied to input 62 of inverter 42.

The components of FIG. 3 that are surrounded by a dot-dash line 95 are constituents of a microprocessor 95. In the exemplifying embodiment, an eight-bit microcontroller, having three PWM (Pulse Width Modulation) generators to generate the three phase currents, and having three sine-wave transducers to generate the three sine-wave voltages of the three-phase system, was used. This is described in FIG. 6. A suitable type is, for example, the PIC16F1938 of Microchip Technology, Inc. of Chandler, Ariz., USA, which has 3 so-called "Capture/Compare/PWM" modules built-in.

Mode of Operation

When motor 40 starts, a rotating voltage field is generated by inverter 42, 43. This field has an amplitude which is sufficiently high to generate a torque that is sufficient to start motor 40.

When motor 40 is running, the voltage amplitude $\hat{U}$ of the rotating field that is to be outputted is then lowered, in steps. The result is, firstly, to decrease the current amplitude, which reaches its minimum at the point of optimum efficiency.

The load on the motor should, in this context, be as constant as possible.

Once the optimum efficiency is reached, the voltage amplitude $\hat{U}$ is held at the value that was reached, as long as no elevation in current (above a predetermined threshold) occurs. If such an elevation in current does occur, it is the consequence of a change in load, and a new operating point is then set, i.e. the above-described seeking function is repeated.

The present invention thus exploits the property according to which the amplitude of the current I becomes minimal at the point of optimum efficiency. In other words, this means that, in order to achieve the same operating state for a different position (angle α in FIG. 1) of current I relative to flux (Psi), this operating state would be achievable only by a higher absolute value for the current amplitude, i.e. with a poorer efficiency. The current value used can be either a phase current, e.g. i_U, or the total current I flowing to motor 40, or (in FIG. 4) the current through resistor 56, i.e. the current through semiconductor switch 52.

Advantages that can be pointed out are, among others:
 The method can be implemented with an inexpensive microprocessor 95.
 The method does not require any motor-specific parameters, and can thus be used with all motors of that type. (Sensorless methods, in contrast, require motor-specific parameters for flux determination.)
 Environmental influences (temperature, humidity) and production tolerances have no influence. This contrasts with sensorless methods for determining rotor position, in which the motor-specific parameters can change as a result of the influence of temperature and because of production tolerances. (Such influences can result in error in estimating the flux and in specifying the controller target value.)

Figure 5:
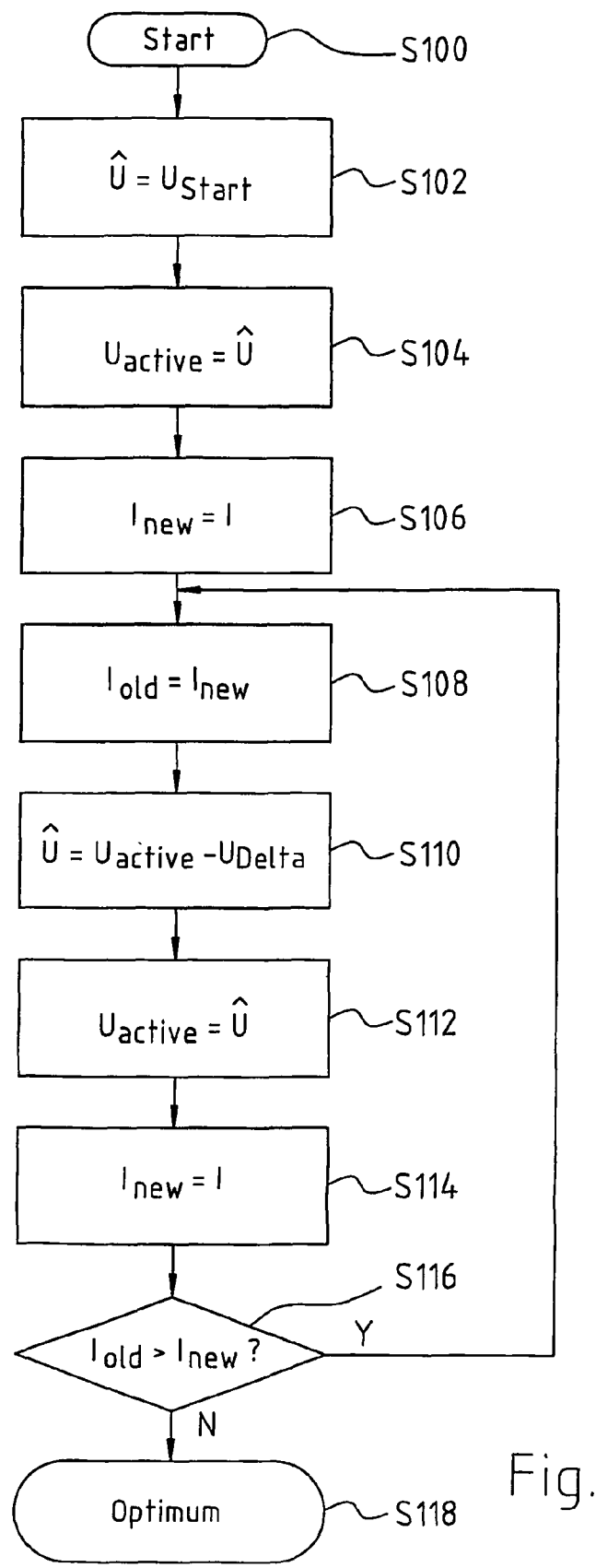
FIG. 5 shows an algorithm for ascertaining electrical values in order to achieve optimum efficiency in the PMSM.

FIG. 5 schematically illustrates execution of an iteration S100, with which motor 40 is adjusted to an optimum working point for the instantaneous load.

At S102, a voltage amplitude $\hat{U}=U_{START}$ is set in component 70 of FIG. 3 (see FIG. 1), and at S104 this instantaneously active amplitude $\hat{U}$ is stored, i.e. $U_{active}=\hat{U}$, so that, at the next iteration, the voltage value $\hat{U}$ used at that time can be stored again.

Figure 4:
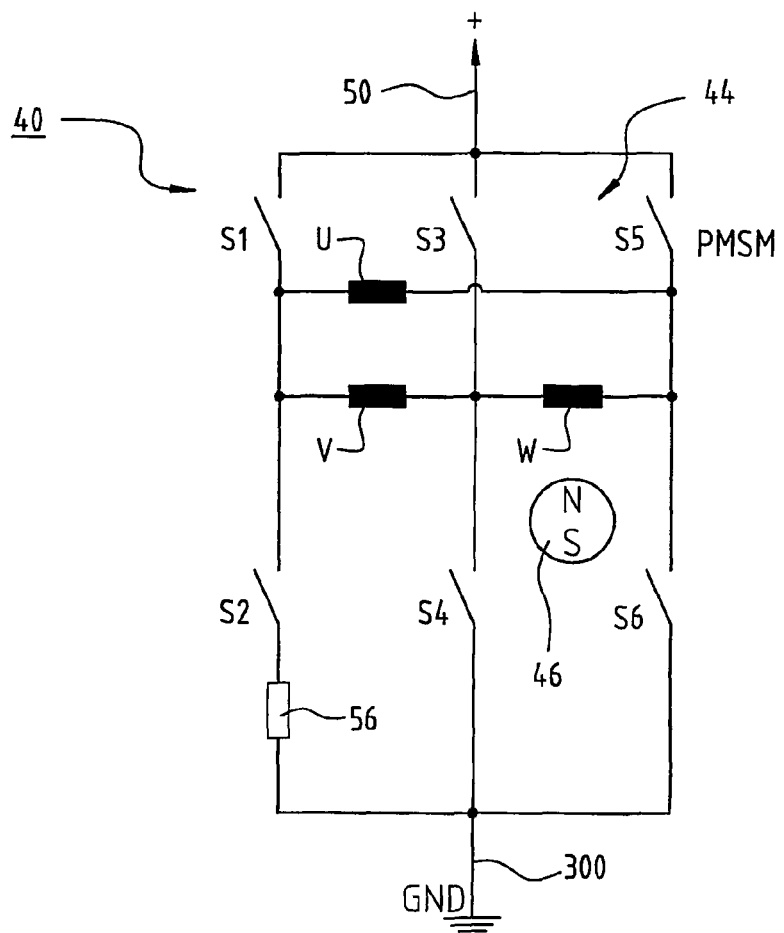
FIG. 4 depicts motor 40 with a delta circuit configuration of stator winding 44.

At S106, the current $I_{new}$ that occurs at this voltage amplitude $\hat{U}$ is measured and stored, i.e. $I_{new}=I$. The measured current can be either the current in one strand of motor 40, e.g. in FIG. 3 the current i_U in strand U, or the total current I that is measured in FIG. 3 at a measuring resistor 66. With the latter variant, the losses are of course somewhat higher, i.e. a somewhat lower efficiency is obtained. The current in resistor 56 of FIG. 4 is also suitable.

At S108, this current $I_{new}$ is copied into a register $I_{old}$, i.e. $I_{old}=I_{new}$, so that the next current value measured in the course of the iteration can then be stored in the register $I_{new}$.

In S110, the voltage amplitude being used is reduced by a predetermined value $U_{Delta}$, i.e.

$$\hat{U}=\hat{U}_{active}-U_{Delta}. \quad (6)$$

At S112, this new voltage amplitude $\hat{U}$ is stored in the register for the value $\hat{U}$, i.e. $\hat{U}_{active}=\hat{U}$.

This reduced voltage amplitude results in a new value for the current $I_{new}$, which either can be of the same magnitude as the previous current value $I_{old}$, or can be smaller or larger than that value. This new current value $I_{new}$ is measured in S114 and stored in the register $I_{new}$.

Step S116 then checks whether $I_{old}$ was greater than $I_{new}$, i.e. whether the current has moved closer to the optimum value, or whether the values have remained the same, or whether $I_{old}$ is less than $I_{new}$, which would mean that the value is moving further away from the optimum.

If the response in S116 is YES, then optimization is not yet complete, and the routine returns to S108, i.e. the current $I_{new}$ measured in S114 is copied into the register $I_{old}$ and steps S110, S112, S114, and S116 are repeated.

A state is ultimately reached in which $I_{old}$ is no longer greater than $I_{new}$, but instead is either of the same magnitude or is, in fact, smaller. In this case, the response in S116 is NO, i.e. the optimum region (for the instantaneous load of motor 40) has been found, and the routine comes to an end at S118, because the optimum region has been ascertained. Motor 40 then runs at that voltage $U_{active}$ from S112 until, if applicable, the load changes.

In the event of load changes, the routine goes back to step S102 and the entire iteration begins again, i.e. motor 40 then seeks, for the new load, a new optimized voltage $\hat{U}$ at which the motor current (or the strand current) arrives at a minimum.

Figure 6:
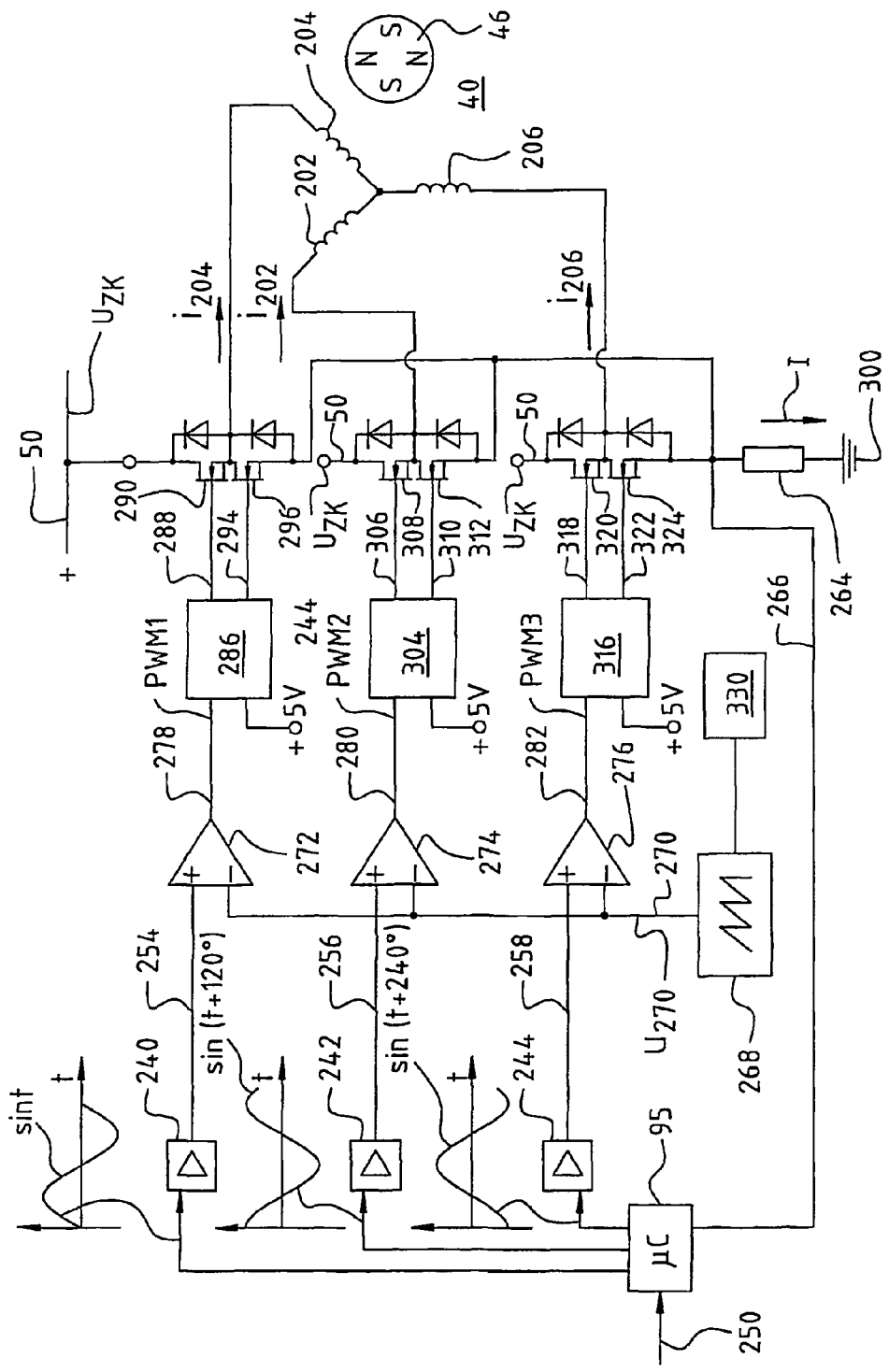
FIG. 6 shows the schematic configuration of a three-phase motor with permanent-magnet excitation.

FIG. 6 shows, on the right, motor 40, the stator of which has three phases 202, 204, 206. Motor 40 has permanent-magnet rotor 46, which is depicted as a four-pole rotor. Its poles are sinusoidally magnetized. One example of a rotor of this kind having sinusoidal magnetization is the rotor according to DE 100 20 946 A1, SCHNEIDER et al, published 15 Nov. 2001, assigned to Siemens AG.

The three phases 202, 204, 206 are supplied with three-phase current that is generated in the motor, the motor being automatically adjusted to good efficiency.

For this, µC 95 generates three sine-wave signals, namely:

sin t sin(t+120°)

sin(t+240°).

The frequency of these three signals is adjustable at μC 95 via a signal 250. Because this frequency specifies the speed of the rotating field, and thus the rotation speed of rotor 40, a rotation speed measurement is not necessary, except if separate rotation speed monitoring of motor 40 is desired, for example, in case it exceeds its pull-out torque and, as a result, comes to a halt.

Figure 7:
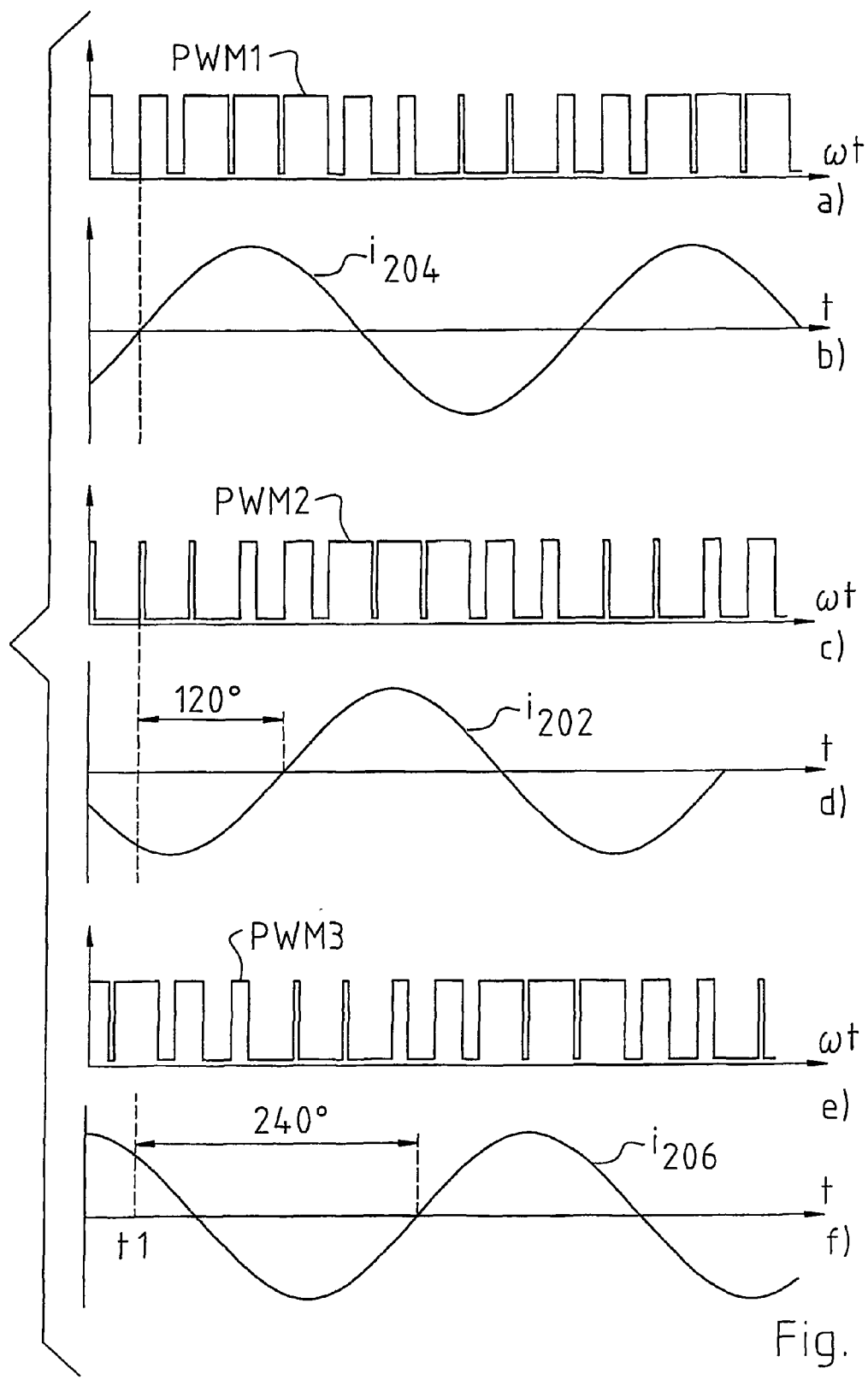
FIG. 7 is a diagram explaining the generation of a three-phase system.

The signals sin t, sin(t+120°), and sin(t+240°) are compared, in comparators 272, 274, 276, with the triangular signal u 270 at the output of a triangular signal generator 268, which is applied to the inverting inputs of the three comparators 272, 274, 276. The associated sine-wave signal from μC 95 is applied, as shown in FIG. 6, to the respective non-inverting input of the associated comparator. The signals PWM1, PWM2, PWM3 (that are shown in FIG. 7) are then obtained, as the outputs of comparators 272, 274, 276.

The signal PWM1 is applied to a driver module 286 whose upper output 288 is connected to the gate of an n-channel MOSFET 290, one terminal of which is connected to lead 50 at which the link circuit voltage $U_{ZK}$ is present. Its other terminal is connected to strand 204.

The lower output 294 of driver module 286 is connected to the gate of an n-channel MOSFET 296, the upper terminal of which is likewise connected to strand 204, and the lower terminal of which is connected via measuring resistor 264 to ground 300.

The signal PWM2 is delivered to a driver module 304, the upper output 306 of which controls an upper n-channel MOSFET 308 and the lower output 310 of which controls a lower n-channel MOSFET 312. The circuit corresponds to that of MOSFETs 290, 296, but MOSFETs 308, 312 control strand 202.

The signal PWM3 is delivered to a driver module 316, the upper output 318 of which controls an upper n-channel MOSFET 320 and the lower output 322 of which controls a lower n-channel MOSFET 324. The circuit corresponds to that of MOSFETs 290, 296, but MOSFETs 320, 324 control strand 206.

When MOSFET 290 and MOSFET 324, for example, are conductive simultaneously, a current flows from positive lead 50 through n-channel MOSFET 290, strands 204, 206, n-channel MOSFET 324, and measuring resistor 264 to ground 300. As shown, recovery diodes are connected in antiparallel with the MOSFETs.

FIG. 7a) shows the signal PWM1 in a highly schematic manner. FIG. 7b) shows the current $i_{204}$ through phase 204 that is caused by the signal PWM1. This is a sinusoidal current that is brought about by the totality of the many switchover operations that take place as rotor 46 rotates.

FIG. 7c) shows the signal PWM2 at the output of comparator 274, and FIG. 7d) shows the current $i_{202}$ through strand 202. This current is likewise sinusoidal, and is offset 120° in phase with respect to strand $i_{204}$.

FIG. 7e) shows the signal PWM3 at output 282 of comparator 276, and FIG. 7f) shows the current $i_{206}$ through strand 206. This current is offset 240° in phase with respect to the current $i_{204}$, and is likewise sinusoidal.

The three sinusoidal currents $i_{204}$, $i_{202}$, and $i_{206}$ together constitute a three-phase system, and generate a rotating field that drives the permanent-magnet rotor 46 at the rotation frequency of that rotating field, as already explained. Because the magnetization of rotor 46 is sinusoidal, a largely constant torque is produced, and that torque is achieved with little complexity. In particular, there is no need for complicated and expensive rotation angle sensors, and motor 40 operates at optimized efficiency.

FIG. 8a) shows, in schematic form, the signal $u_{270}$ that is generated by triangular signal generator 268. The frequency of the signal $u_{270}$ is assumed here to be 20 kHz, i.e. one triangle of the triangular signal $u_{270}$ has a period length of 50 μs. The first triangle, labeled 338, begins at the 0 μs time, reaches its maximum at 25 μs, and returns to zero at 50 μs. It is therefore symmetrical, and preferably has the shape of an isosceles triangle. Its frequency is also high in relation to the frequency of the signal sin t.

As long as the latter signal is greater than $u_{270}$, the signal PWM1 depicted in FIG. 8b) is HIGH. If Hl becomes less than $u_{270}$, PWM 1 then takes on the LOW value. This results in the profile (depicted in FIG. 8b)) that is typical for PWM1, where the pulse duty factor is high to the left and right, e.g. 90%, while in the middle it has a value of approximately 10%, producing a largely symmetrical profile in FIG. 8b).

Figure 8:
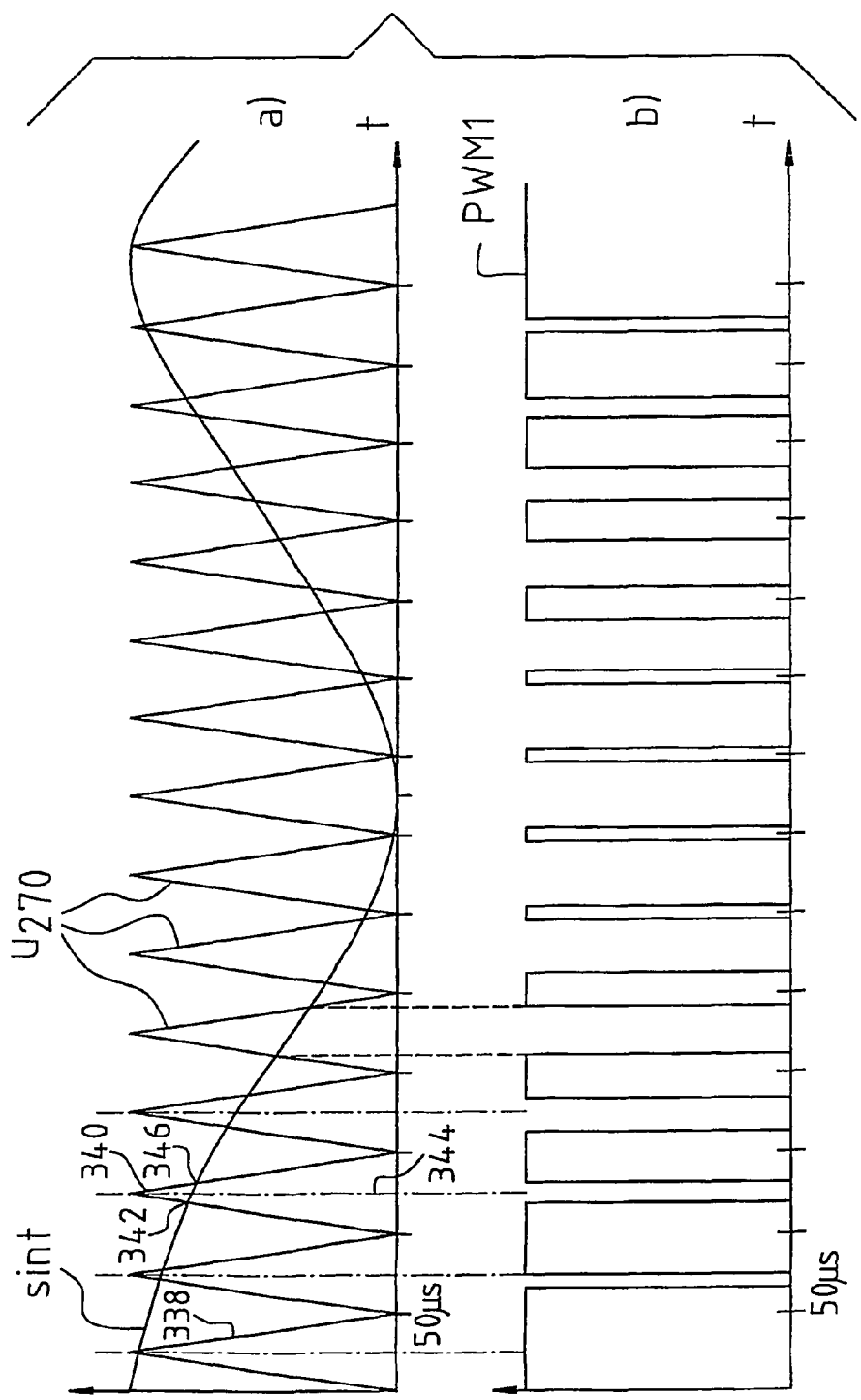
FIG. 8 depicts the digitization of a sinusoidal voltage.
Figure 9:
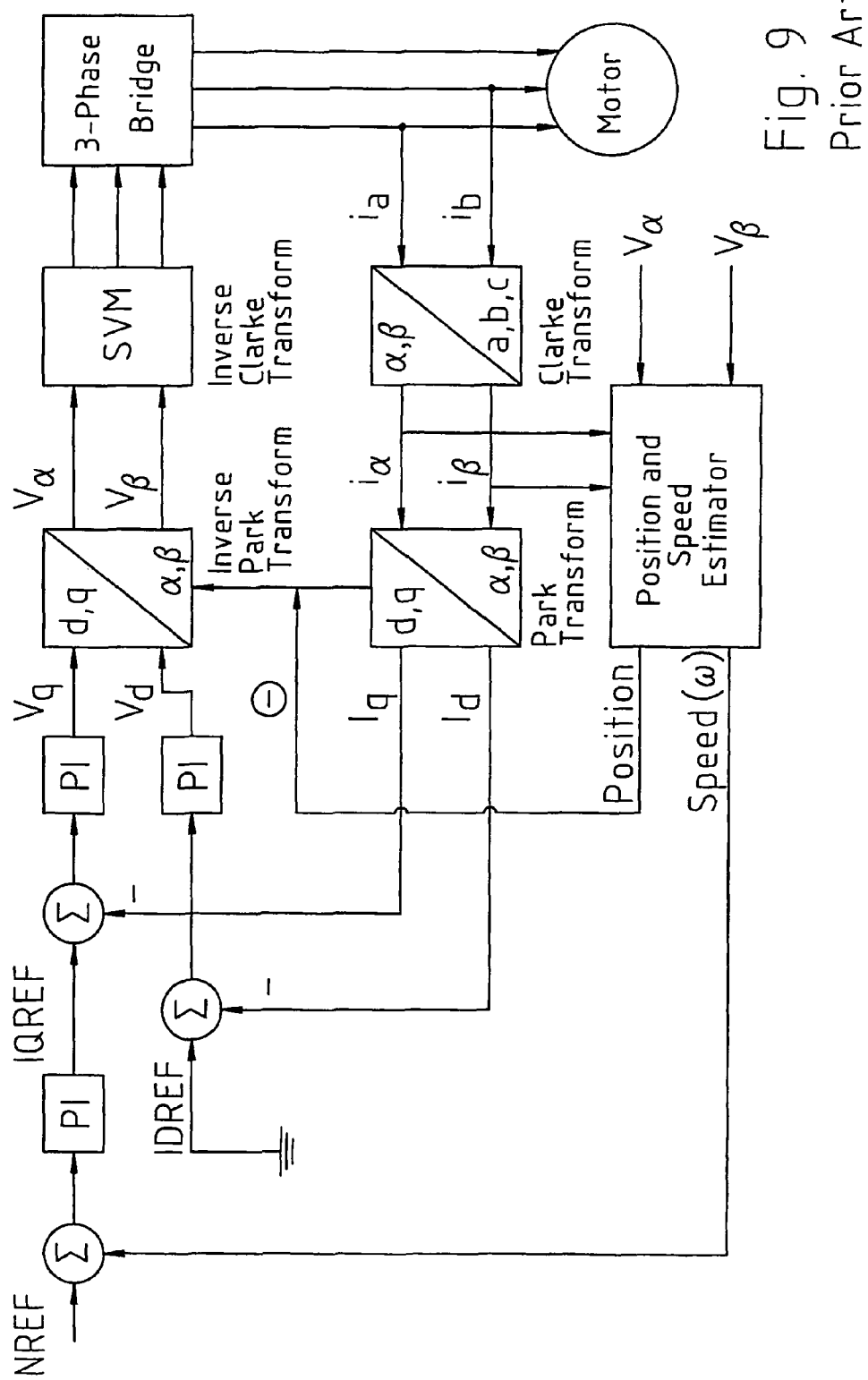
FIG. 9 depicts an arrangement according to the prior art.

Be it noted that FIG. 8 shows a simplification, since in reality over one hundred triangles of the signal $u_{270}$ are obtained for the duration of one period of the signal sin t, but this could not be depicted graphically.

The symmetrical triangular shape of the pulses of the signal $u_{270}$ yields the advantage that the PWM signals according to FIG. 8b) are always located substantially symmetrically with respect to the maximum of a triangle.

The invention thus provides a simple configuration for a three-phase motor 40 of this kind, the rotation speed being specifiable by the signal at input 250 (FIG. 6). The current for the optimization procedure according to FIG. 4 is normally measured or sampled at only a single bridge arm, e.g. by means of measuring resistor 56 depicted there, so that good efficiency is obtained.

Numerous variants and modifications are of course possible, within the scope of the present invention.

The invention claimed is:

1. A method of improving efficiency in a three-phase motor (40) having permanent-magnet excitation, a DC link power supply circuit including a current measuring element (56), and a control circuit (95) having an input coupled to an output of said current measuring element (56) and control outputs (A, B, C) coupled to respective phase windings of said motor, comprising the steps of:
   a) at a predetermined operating voltage (Û), operating the motor (40) at a load that deviates little or not at all from a predetermined value while performing additional steps;
   b) using said current measuring element to make a first sampling of amplitude of a current flowing to the motor (40) and storing a first measured value of said amplitude (S106, S108);
   c) reducing the amplitude of the voltage (Û) delivered to the motor (S110);
   d) making a second sampling of amplitude of the current flowing to the motor (40) and storing a second measured value of said amplitude;
   e) comparing said second measured amplitude value with said first measured amplitude value;
   f) if a result of said comparing step shows that the current flowing to the motor (40) has not decreased as a result of the reduction in the voltage amplitude (Û), operating the motor at that current;
   g) if said result of said comparing step shows that the current flowing to the motor (40) has decreased as a result of the reduction in the voltage (Û) delivered to the motor, repeating said sampling and comparing steps in order to identify values for optimized efficiency.

2. The method according to claim 1,
further comprising operating the motor (40) at a substantially constant load in the context of measurements of current values, said current values being processed (S106-S116) to control operational parameters to improve efficiency.

3. The method according to claim 1, further comprising monitoring to detect any change in load, and, in case of detection of a change in load, repeating said sampling and comparing steps, in order to identify new values for optimized efficiency.

4. The method according to claim 1, further comprising an initial step of operating the motor by applying a predetermined voltage ($\hat{U}$) to terminals of a winding of the motor.

5. An electric motor (40) comprising
a permanent-magnet rotor (46) and a stator (44);
a DC link circuit (50-54) having first and second output leads (50) supplying electrical power to control circuits (42, 43) which in turn apply a respective current to each of a plurality of phase windings (U, V, W) which form part of said stator (44);
a current measuring element (56) located in series with one of said first and second link circuit output leads (50) and generating an output signal (I) representing amplitude of total currents applied from said DC link circuit to said plurality of phase windings; and
an apparatus (84-92) coupled to an output of said measuring element (56) and adapted to apply a respective sinusoidal currents ($i_{202}$, $i_{204}$, $i_{206}$) to each respective one of said phase windings of said motor (40), and
a microprocessor (95) configured to execute the steps of:
a) at a predetermined operating voltage, operating the motor at a substantially constant load while performing additional steps;
b) using said measuring element (56) to make a first sampling of amplitude of current (I) flowing to the motor (40) and storing a first measured value of said amplitude (S105, S108);
c) reducing amplitude of voltage delivered to the motor (40);
d) making a second sampling of amplitude of current flowing to the motor (40) and storing a second measured value of said amplitude;
e) comparing said second measured amplitude value with said first measured amplitude value;
f) if a result of said comparing step shows that the current flowing to the motor (40) has not decreased as a result of the reduction in the voltage amplitude, operating the motor at that current;
g) if said result of said comparing step shows that the current flowing to the motor (40) has decreased as a result of the reduction in the voltage amplitude, repeating said sampling and comparing steps, in order to identify values for optimized efficiency.

6. The motor according to claim 5, wherein
said microprocessor monitors to detect any change in motor load and, in case of detection of such a change, repeats said sampling and comparing steps until new values for optimized efficiency have been determined; and thereafter operates said motor using said new values.

7. The motor according to claim 6, further comprising
three transducers adapted to generate three respective sinusoidal output signals, offset 120° with respect to each other; and
three pulse-width modulation generators (272, 274, 276) in each of which a sinusoidal signal is compared with an output signal from a triangular signal generator (268), in order to produce a respective control signal for controlling a respective phase of a three-phase inverter (42, 43).

8. The motor of claim 7, wherein the motor includes
a inverter bridge circuit, and
wherein said current measuring element (56, 264) is provided in said inverter bridge circuit, for measuring motor current as part of said motor current sampling and measuring steps.

9. The motor of claim 6, wherein the motor includes
a inverter bridge circuit, and
wherein said current measuring element (56, 264) is provided in said inverter bridge circuit, for measuring motor current as part of said motor current sampling and measuring steps.

10. The motor according to claim 5, further comprising
three transducers adapted to generate three respective sinusoidal output signals, offset 120° with respect to each other; and
three pulse-width modulation generators (272, 274, 276) in each of which a sinusoidal signal is compared with an output signal from a triangular signal generator (268), in order to produce a respective control signal for controlling a respective phase of a three-phase inverter (42, 43).

11. The motor of claim 10, wherein the motor includes
a inverter bridge circuit, and
wherein said current measuring element (56, 264) is provided in said inverter bridge circuit, for measuring motor current as part of said motor current sampling and measuring steps.

12. The motor according to claim 5, wherein
the microprocessor generates a signal which controls a rotating magnetic field of the motor and further indicates rotation speed of said motor.

13. The motor of claim 5, wherein the motor includes
a inverter bridge circuit, and
wherein said current measuring element (56, 264) is provided in said inverter bridge circuit, for measuring motor current as part of said motor current sampling and measuring steps.

* * * * *